(12) United States Patent
Bent et al.

(10) Patent No.: US 7,475,111 B2
(45) Date of Patent: Jan. 6, 2009

(54) METHOD OF INFORMATION CAPTURE AND VISUALIZATION

(75) Inventors: Graham Anthony Bent, Southampton (GB); Darren Mark Shaw, Fareham (GB)

(73) Assignee: International Business Machines Corporation, Armonk, NY (US)

(*) Notice: Subject to any disclaimer, the term of this patent is extended or adjusted under 35 U.S.C. 154(b) by 871 days.

(21) Appl. No.: 10/960,610

(22) Filed: Oct. 7, 2004

(65) Prior Publication Data

US 2005/0129053 A1  Jun. 16, 2005

(30) Foreign Application Priority Data

Dec. 10, 2003  (GB) .................................. 0328567.3

(51) Int. Cl.
G06F 15/16 (2006.01)
G06F 17/00 (2006.01)
G06N 5/00 (2006.01)
G06N 5/02 (2006.01)

(52) U.S. Cl. .................. 709/204; 709/206; 706/45; 706/46

(58) Field of Classification Search .............. 709/204, 709/206; 706/45, 46
See application file for complete search history.

(56) References Cited

U.S. PATENT DOCUMENTS 6,832,224 B2 * 12/2004 Gilmour ..................... 707/100

2003/0084053 A1   5/2003  Govrin et al. ............... 707/100

OTHER PUBLICATIONS

Eytan Adar, "Shock: Aggregating Information While Preserving Privacy", Jan. 2003, Kluwer Academic Publishers, Information Systems Frontiers vol. 5: Issue 1, pp. 15-28.*

Adriana S. Vivacqua, "agents for Expertise Location", Mar. 1999, American Association for Artificial Intelligence, pp. 1-5.*

* cited by examiner

*Primary Examiner*—Glenton B Burgess
*Assistant Examiner*—Barak Nissan
(74) *Attorney, Agent, or Firm*—Duke W. Yee; Libby Z. Handelsman; Mari A. Stewart

(57) ABSTRACT

A computer implemented method of information capture is provided. Each node in a knowledge network associated with a first piece of expertise information that communicates with at least one other node associated with the first piece of expertise information is aggregated to form a first expertise network. Each node in the first expertise network associated with a second piece of expertise information that communicates with at least one other node associated with the second piece of expertise information is aggregated to form a second expertise network. Visual representations of the knowledge network, the first expertise network, and the second expertise network are generated. Trends and patterns are determined using the visualization of the knowledge network, the visualization of the first expertise network, and the visualization of the second expertise network.

5 Claims, 8 Drawing Sheets

| NODE | ELECTRONIC MESSAGES SENT | ELECTRONIC MESSAGES RECEIVED |
|---|---|---|
| 003 | 1 TO 004<br>2 TO 005 | 2 FROM 004<br>1 FROM 005 |
| 004 | 2 TO 003 | 1 FROM 003<br>2 FROM 005 |
| ⋮ | ⋮ | ⋮ |
| 007 |  | 1 FROM 006 |

800

805 — 
```
Node Identifier: 007
Organization:   Intellectual Property
Skills:         Copyright
Time:           17:50; 27/04/2003
```

810 — I have attached a news article detailing the latest case law relating to copyright.

FIG. 8

METHOD OF INFORMATION CAPTURE AND VISUALIZATION

FIELD OF THE INVENTION

The present invention relates to information capture and more particularly, to information capture in an environment comprising a plurality of communicating nodes.

BACKGROUND OF THE INVENTION

Knowledge (i.e. information that means something) is a key asset to an organisation and exploiting the knowledge within an organisation is becoming more and more important. Knowledge management allows capture, storage and analysis of information flowing within an organisation. The popularity of electronic communication mechanisms such as electronic mail, instant messaging, newsgroups etc. has become more widespread as they allow remote users to exchange information via electronic messages. These electronic messages can be captured and stored to provide a repository of information that can be analysed in order to capture knowledge.

Analysis can be carried out in many ways. In one example, the electronic messages exchanged between entities (e.g. individuals, computers etc.) in an electronic network, can be analysed in order to capture knowledge. Information associated with the entities and associated electronic messages represent a knowledge network. In FIG. 1, the knowledge network is visually represented. Each entity is represented as a node (i.e. A-J) and an electronic message sent by an entity is represented as an arrow, wherein the arrowhead represents the direction of sending. It can be seen that several electronic messages between entities A and B, B and F, I and J, have been exchanged and this implies strong relationships between those entities. In another example, the frequency of electronic messages between entities can be analysed in order to further analyse strengths of relationships between entities. It can also be seen that that entity A has an important role in the knowledge network, because of the number of other entities (i.e. B, C, D, E and F) communicating with entity A. It can also be seen that the knowledge network comprises two sub-networks, a first sub-network comprising entities A, B, C, D, E, F, G, and H and another sub-network comprising entities I and J.

It should be understood that there are disadvantages associated with these analysis mechanisms. In an electronic network, some of the electronic messages being exchanged may be trivial and meaningless for a particular type of knowledge capture. For example, entity A may have sent and received electronic messages in an erroneous broadcast. Yet from FIG. 1, it had previously been deduced that entity A plays an important role in the knowledge network. In another example, communication between members of a group is found to be as frequent as communication between members of the group and individuals outside of the group. The communication within the group is in fact due to social aspects (e.g. jokes, arranging social gatherings etc.) and the communication between members of the group and individuals outside of the group is due to the expertise of the group members (e.g. the group members work at a call centre and deal with customer calls). In order to capture knowledge relating to expertise, it is the latter communication that is important. However, this is masked by the inter-group communications.

It is therefore difficult to capture relevant knowledge from all the communications that are occurring in an electronic network. One prior art mechanism analyses the content of electronic messages being exchanged between individuals. This provides knowledge regarding the topics of interest that are being communicated. However, this mechanism has an associated performance overhead. Another prior art mechanism applies one or more filters to captured information in order to filter out non-relevant information, see for example US. 2003/0084053.

SUMMARY OF THE INVENTION

A computer implemented method of information capture and visualization is provided for use in an environment comprising a plurality of nodes. Information associated with a plurality of nodes in an electronic network and information associated with electronic messages that have been communicated by the plurality of nodes is retrieved. A node communicates with another node via an electronic message. Each node represents at least one entity. The plurality of nodes is a knowledge network. An input comprising expertise information is received from a user. The input comprises at least one filter. The at least one filter is applied to the electronic messages to filter out electronic messages associated with the filter. If the at least one filter filters out all electronic messages associated with a given node in the plurality of nodes, the given node is also filtered out of the knowledge network. A visualization of the plurality of nodes and electronic messages remaining in the knowledge network after application of the at least one filter is generated to form a visual representation of the knowledge network. The visual representation comprises a visualization of the number of electronic messages that have been sent and the number of electronic messages that have been received by the nodes in the knowledge network. In response to receiving an input comprising a first piece of expertise information from the user, nodes within the plurality of nodes remaining in the knowledge network that are associated with the first piece of expertise information are determined to form a first set of nodes within the plurality of nodes remaining in the knowledge network. Each node in the first set of nodes that is both associated with the first piece of expertise information and communicates with at least one other node in the first set of nodes via an electronic message is aggregated to form a second set of nodes. A node communicates with at least one other node if the node sends or receives an electronic message with the at least one other node. The second set of nodes and the electronic messages associated with the second set of nodes represent a first expertise network. The first expertise network is a sub-network of the knowledge network. A visualization of the nodes and electronic messages in the first expertise network is generated to form a visual representation of the first expertise network. The visual representation comprises a visualization of the number of electronic messages that have been sent and the number of electronic messages that have been received by the nodes in the first expertise network. In response to receiving an input comprising a second piece of expertise information from the user, nodes within the second set of nodes that are associated with the second piece of expertise information are determined to form a third set of nodes within the plurality of nodes. Each node in the third set of nodes that is both associated with the second piece of expertise information and communicates with at least one other node in the third set of nodes via an electronic message are aggregated to form a fourth set of nodes. The fourth set of nodes and the electronic messages associated with the fourth set of nodes represent a second expertise network. The second expertise network is a sub-network of the first expertise network. A visualization of the nodes and electronic messages in the second expertise network is generated to form a visual representation of the second expertise network. The visual representation comprises a visualization of the number of electronic messages that have been sent and the number of electronic messages that have been received by the nodes in the second expertise network. Trends and patterns are determined using the visualization of the knowledge network, the visualization of the first expertise network, and the visualization of the second expertise network.

In one embodiment, the environment is a peer-to-peer environment. In a preferred embodiment, the system further comprises means for receiving an input comprising at least one filter and means, responsive to receiving the input, for applying the at least one filter to at least one of: the plurality of nodes and the electronic messages associated with the plurality of nodes. In a preferred embodiment, the system further comprise means for receiving an input comprising at least one filter and means, responsive to receiving the input, for applying the at least one filter to a header of an electronic message associated with the plurality of nodes. In one embodiment, the input comprising at least one filter is received from a profile associated with a node of the plurality of nodes.

In one embodiment, the means for determining further comprises means for retrieving the expertise information from profiles associated with the first set of the plurality of nodes. In another embodiment, the means for determining further comprises means for retrieving the expertise information from a header of an electronic message associated with the first set of the plurality of nodes.

In one embodiment, the expertise information is associated with an organisation of a node (e.g. a division, a department etc.) In another embodiment, the expertise information is associated with a skill of a node (e.g. technical skills, legal skills etc.). In one implementation, the system is executed according to a pre-defined time period, in order to capture temporal information. In another implementation, the system is executed in another environment, in order to capture spatial information.

Preferably, the information associated with the second set of a plurality of nodes comprises node identifiers. More preferably, the information associated with the electronic messages associated with the second set of a plurality of nodes comprises a number of electronic messages.

In a preferred embodiment, the system further comprises means for retrieving information associated with: the plurality of nodes and the electronic messages associated with the plurality of nodes. In one embodiment, the information associated with: the plurality of nodes and the electronic messages associated with the plurality of nodes is retrieved from a log in the environment. In another embodiment, the information associated with: the plurality of nodes and the electronic messages associated with the plurality of nodes is retrieved from the plurality of nodes.

According to a second aspect, the present invention provides a method of information capture for use in an environment comprising a plurality of nodes, wherein a node communicates with another node via an electronic message and wherein expertise information is associated with a first set of the plurality of nodes; the method comprising the steps of: receiving an input comprising expertise information; determining the first set of the plurality of nodes associated with expertise information; aggregating a second set of a plurality of nodes of the first set, wherein each node in the second set is associated with the expertise information and communicates with another node in the second set via an electronic message; and generating a visual representation from information associated with: the second set of a plurality of nodes and the electronic messages associated with the second set of a plurality of nodes.

According to a third aspect, the present invention provides a computer program comprising program code means adapted to perform all the steps of the above method when said program is run on a computer.

BRIEF DESCRIPTION OF THE DRAWINGS

The present invention will now be described, by way of example only, with reference to preferred embodiments thereof, as illustrated in the following drawings:

FIG. 8 is an overview diagram of an electronic message comprising a header that is used in order to receive an input comprising at least one piece of information or an input comprising at least one filter;

DETAILED DESCRIPTION OF THE PREFERRED EMBODIMENT

Figure 1:
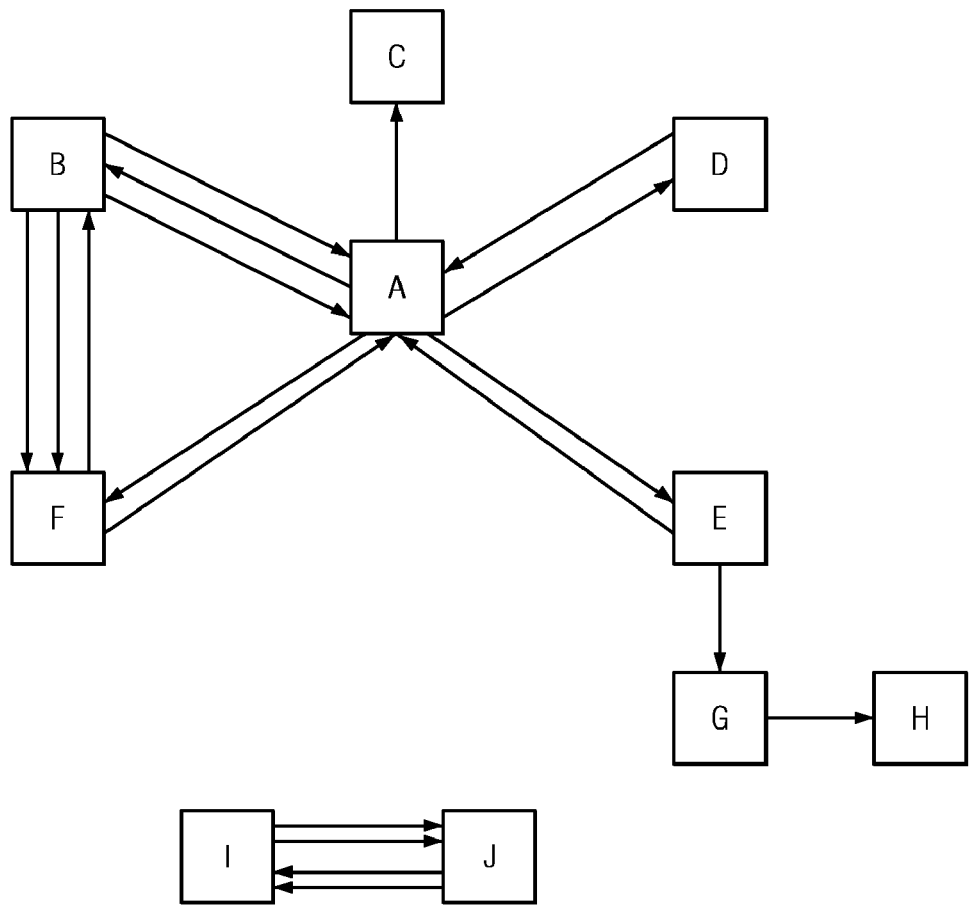
FIG. 1 is a prior art visual representation of a knowledge network.
Figure 2:
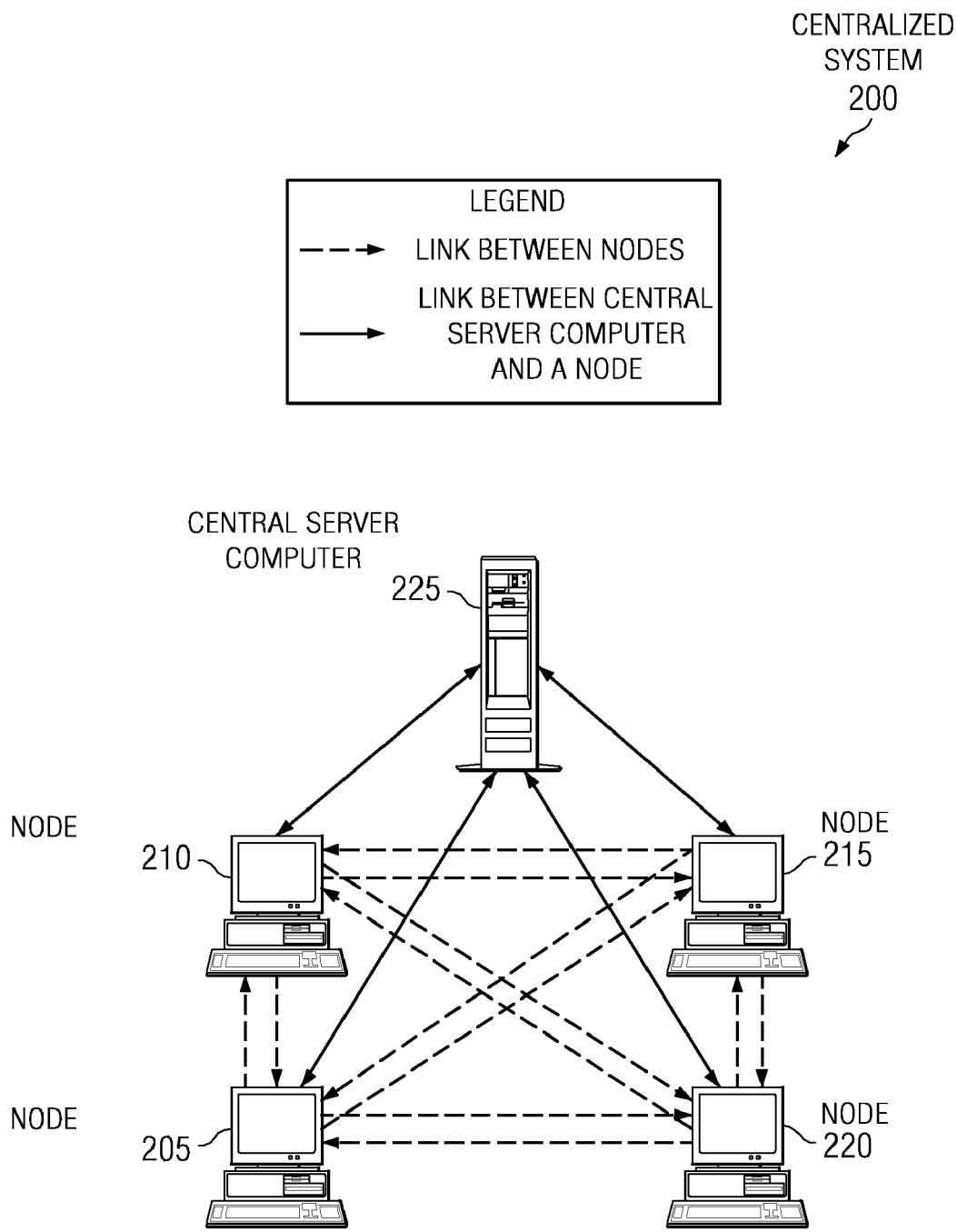
FIG. 2 is an overview of one embodiment of an electronic network in which the present invention may be implemented.
Figure 3:
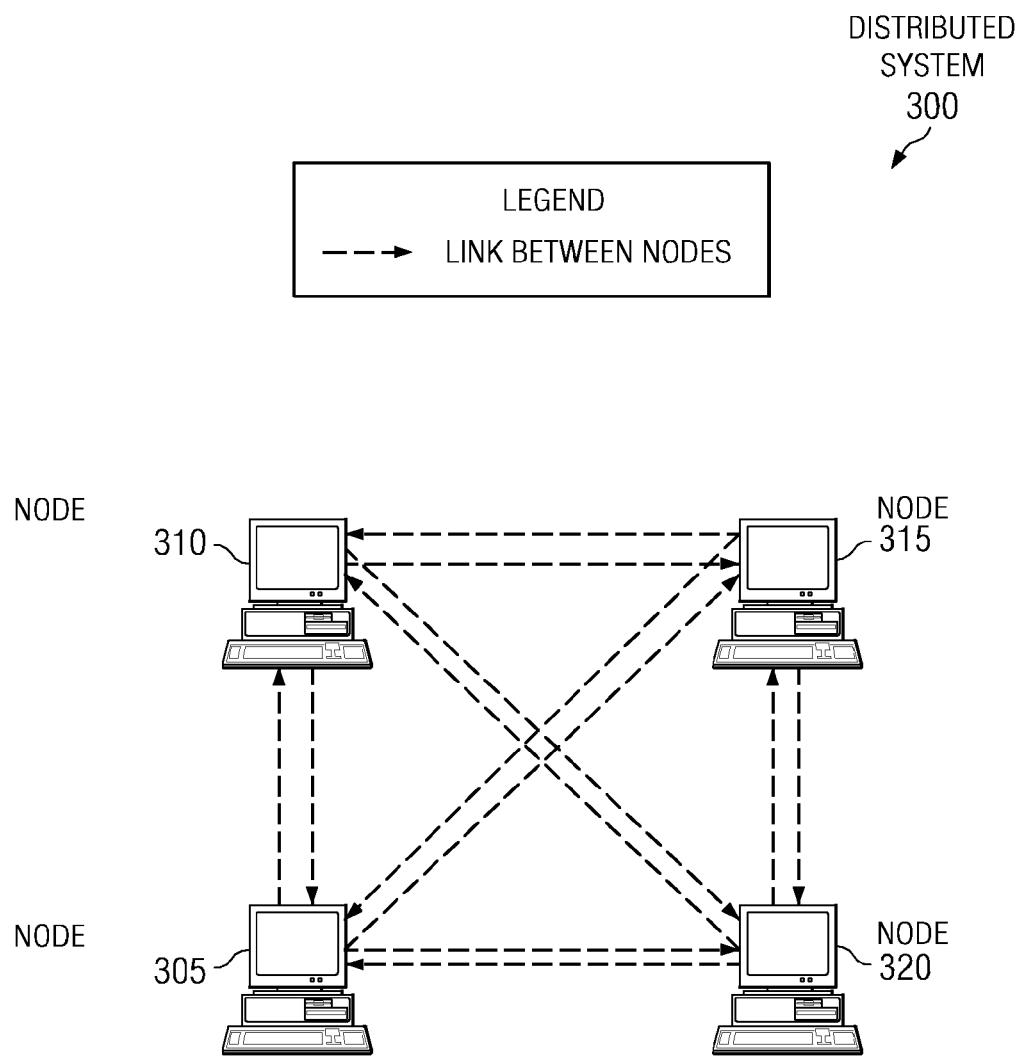
FIG. 3 is an overview of another embodiment of an electronic network in which the present invention may be implemented.

FIG. 2 is an overview diagram of a centralised system (200) in which the present invention may be implemented. The system (200) comprises an electronic network of a plurality of nodes (205, 210, 215, 220) and a central server computer (225). The plurality of nodes (205, 210, 215, 220) are linked to each other (shown by dashed arrows) and with a central server computer (225) (shown by bold arrows). FIG. 3 is an overview diagram of a distributed system (300) in which the present invention may be implemented. The system (300) comprises an electronic network of a plurality of nodes (305, 310, 315, 320) that are linked to each other (shown by dashed arrows).

A node represents at least one entity, for example, an individual, a computer (e.g. a knowledge base, an expert system) etc. Thus, a node can represent more than one entity, for example, a node can represent an organisation of individuals, a department of individuals, a system of computers etc.

In an electronic network, a node communicates (i.e. sends and/or receives) with another node via one or more electronic messages (e.g. an instant message, an e-mail, a text message etc.). Furthermore, information representing expertise is associated with one or more sets of nodes in the electronic network. The term expertise is used to mean information associated with a particular field (e.g. skills, organisation information, qualifications etc.)

Figure 4:
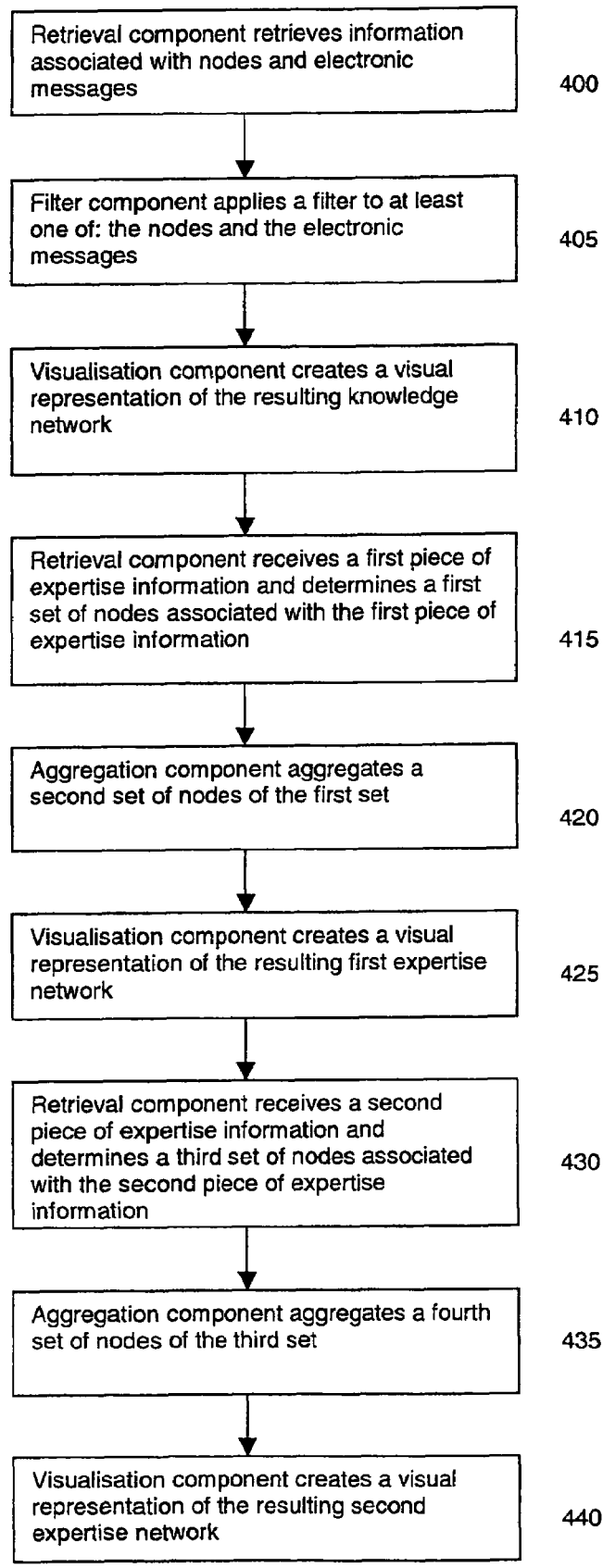
FIG. 4 is a flow chart showing the operational steps involved in one embodiment of creating a knowledge network and expertise networks.
Figures 5, 6B:
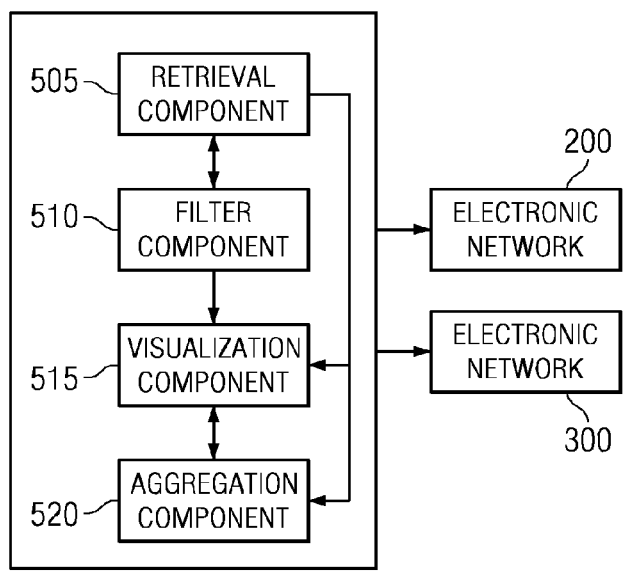
FIG. 5 is a block diagram of one embodiment of a system in which the present invention may be implemented.
FIG. 6B is an overview diagram of another embodiment of the visualisation of the knowledge and expertise networks created by the process of FIG. 4.

The present invention will now be described with reference to FIG. 4 and a system (500) shown in FIG. 5. The system (500) communicates with one or more electronic networks (e.g. the electronic networks 200 and 300 in FIG. 2 and FIG. 3 respectively). At step 400, information associated with the electronic messages that have been communicated (e.g. the number of electronic messages that have been sent and/or received, a link showing that a communication has occurred, but not showing the number or direction of the electronic messages etc.) and information associated with the nodes in the electronic network (e.g. node identifiers) is retrieved by a retrieval component (505). The retrieved information represents a knowledge network.

In a first embodiment, the information is retrieved in a pre-processing phase. In a second embodiment, retrieval of the information occurs as and when electronic messages are sent and received by nodes in real time.

In a first example, the information is retrieved by analysing a log on a central server (e.g. 225), wherein the log stores the information. In a second example, the information is retrieved only from nodes that have given authorisation. In a third example, each node in the electronic network collects the electronic messages that it has sent and the electronic messages that it has received. The retrieval component (505) then retrieves information regarding the collected electronic messages and information regarding the node information from each node. In a fourth example, collection of the electronic messages and retrieval of information occurs in a peer-to-peer architecture. In a peer-to-peer architecture, each node communicates directly with a number of other nodes (wherein the nodes represent a group within the architecture). In one example, electronic message collection and information retrieval is executed by each node, wherein each node collects electronic messages sent by itself and electronic messages received from the nodes that it communicates directly with. A retrieval component (505) on each node retrieves information associated with the electronic messages and information associated with the node itself and the nodes that it communicates directly with. The retrieved information can then either be passed to all other nodes in the architecture, or can be kept within the group.

Optionally at step 405, one or more filters can be applied to at least one component of the electronic network (i.e. the nodes, the communicated electronic messages, or both) by a filter component (510), wherein a filter acts as a constraint on the at least one component. An input comprising at least one filter is received by the filter component (510) (for example, wherein the input is retrieved from at least one node or from a user of the system (500) etc.). The filter component (510) then applies the received at least one filter to the at least one component. If the at least one component is associated with the at least one filter, the at least one component is filtered out of the knowledge network. It should be understood that if the at least one filter is applied to the electronic messages, and if all electronic messages associated with a node are associated with the at least one filter, then optionally, the node is also filtered out of the knowledge network. It should be understood that the at least one filter can be applied either before or after step 400.

Figure 6A:
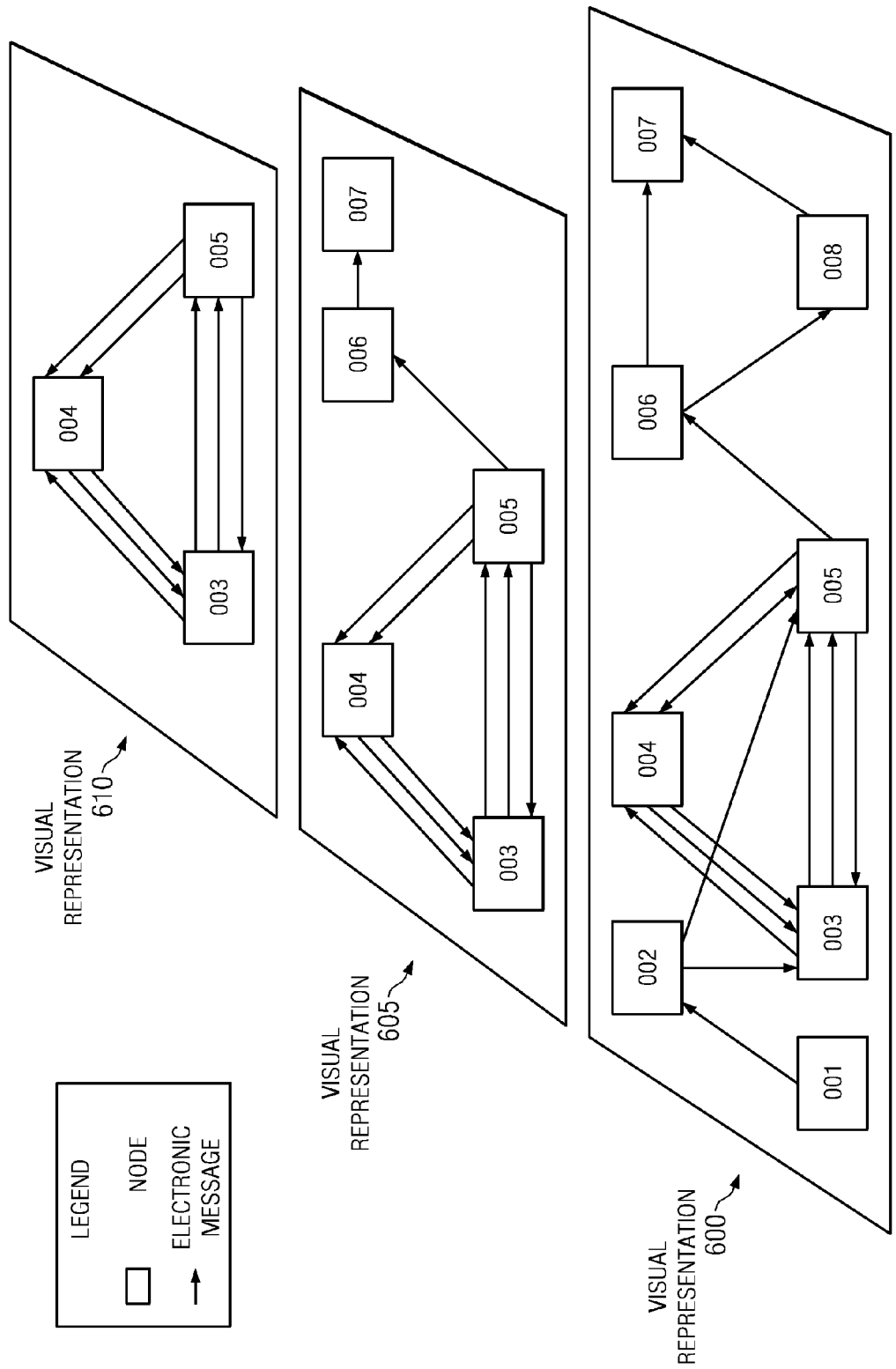
FIG. 6A is an overview diagram of one embodiment of the visualisation of the knowledge and expertise networks created by the process of FIG. 4.

Next, optionally, the resulting knowledge network comprising information associated with the remaining electronic messages and associated nodes is represented visually (step 410) by a visualisation component (515). The visual representation (600) is shown in FIG. 6A (in this example, the information associated with electronic messages comprises the number of electronic messages that have been sent and/or received). It can be seen that the knowledge network comprises eight nodes (001-008). Advantageously, the visual representation of a knowledge network can be used for determining trends, patterns etc.

At step 415, an input comprising at least one piece of expertise information is received by the system (500). In this embodiment, the retrieval component (505) receives an input comprising at least one piece of expertise information (for example, wherein the input is received from at least one node or from a user of the system (500) etc.). In this embodiment, the input comprises a first piece of expertise information that represents the organisation that a node is associated with, namely, "Intellectual Property".

As described above, information representing expertise is associated with one or more sets of nodes in the electronic network. In response to receiving the input, the system (500), in this example, the retrieval component (505) in the system (500), uses this information and associated node information to determine (step 415) that nodes 001, 003, 004, 005, 006 and 007 are associated with the first piece of expertise information. These nodes are a first set of nodes.

In this example, an aggregation component (520) aggregates (step 420) a second set of nodes of the first set of nodes, wherein each node in the second set is associated with the first piece of expertise information and each node in the second set communicates with another node in the second set via an electronic message. When the nodes are aggregated, it is found that nodes 003, 004, 005, 006 and 007 are associated with the first piece of information, wherein each node communicates (i.e. sends and/or receives electronic messages) with another node in the second set and it is found that node 001 is associated with the first piece of information but does not communicate with another node in the second set. Therefore nodes 003, 004, 005, 006 and 007 are a second set of nodes.

Information associated with: the second set of nodes and the electronic messages associated with the second set of nodes represent an expertise network. The expertise network is a sub network of the knowledge network, in this example, a first expertise network. In this example the first expertise network comprises information associated with: the second set of nodes (003, 004, 005, 006 and 007) and the electronic messages associated with the second set of nodes.

At step 425, the visualisation component (515) represents the first expertise network visually. An example of the visual representation (605) is shown in FIG. 6A. Advantageously, the visual representation of the first expertise network can be used for determining trends, patterns etc. For example, in 605, it can be seen that five nodes (i.e. 003, 004, 005, 006, 007) out of the eight nodes in the knowledge network (i.e. 001-008) are associated with the Intellectual Property organisation, wherein each node communicates with another node in the Intellectual Property organisation. It can also be seen that the nodes 003, 004 and 005 have exchanged several electronic messages, which indicates a strong relationship.

It should be understood, that further pieces of expertise information can be applied (either to the knowledge network and/or to the expertise network). In this embodiment, at step 430, the retrieval component (505) receives an input comprising a second piece of expertise information, wherein the second piece of information represents the skills associated with a node, namely, copyright skills. In response to receiving the input, the retrieval component (505) determines (step 430) that nodes 003, 004 and, 005 are associated with the second piece of information. The nodes are a third set of nodes.

An aggregation component (520) aggregates (step 435) a fourth set of nodes of the third set of nodes, wherein each node in the fourth set is associated with the second piece of expertise information and each node in the fourth set communicates with another node in the fourth set via an electronic message. With reference to FIG. 6A, when the nodes are aggregated, it is found that nodes 003, 004 and 005 are associated with the second piece of information, wherein each node communicates with another node in the fourth set.

Information associated: with the fourth set of nodes and the electronic messages associated with the fourth set of nodes represent a second expertise network that is a sub network of the first expertise network. In this example the second expertise network comprises information associated with: the fourth set of nodes (003, 004, and 005) and the electronic messages associated with the fourth set of nodes.

At step 440, the visualisation component (515) represents the second expertise network visually. The visual representation (610) is shown in FIG. 6A. Advantageously, the visual representation of the second expertise network can be used for determining trends, patterns etc. For example, it can also be seen that three nodes (003, 004, 005) out of the five nodes in the Intellectual Property organisation have copyright skills, wherein each node communicates with another node that has copyright skills. It can also be seen that the three nodes exchange several electronic messages and this indicates a strong relationship.

It should be understood that further analysis can be carried out on the expertise networks, for example, examination of the content of the electronic messages exchanged, in order to determine more about the reason for communications, the topics of information being exchanged etc. It should also be understood that the knowledge and expertise networks can be visualised in other ways. For example, the first expertise network 605 can be visualised as a list (615) as shown in FIG. 6B.

In one embodiment, the process of the present invention is repeated according to a pre-defined time period, wherein at least one piece of expertise information is applied to a knowledge network and/or an expertise network. This allows the capture of at least one temporal expertise network, that is, an expertise network that is associated with time. This is useful, for example, to capture knowledge regarding established relationships, wherein electronic messages are communicated regularly (for example, between individual in the human resources organisation and between individuals in management). In this embodiment, it is preferable that electronic messages are retained (e.g. in a server log, on the nodes themselves etc.) for at least the amount of time defined by the time period.

In another embodiment, the process of the present invention is repeated in other knowledge and/or expertise networks, wherein at least one piece of information is applied to the other knowledge and/or expertise networks. This allows the capture of at least one spatial expertise network, that is, an expertise network that is similar to expertise networks that have already been captured. This is useful, for example, to capture knowledge in other parts of the same company (e.g. subsidiaries, other organisations etc.).

Figure 7:
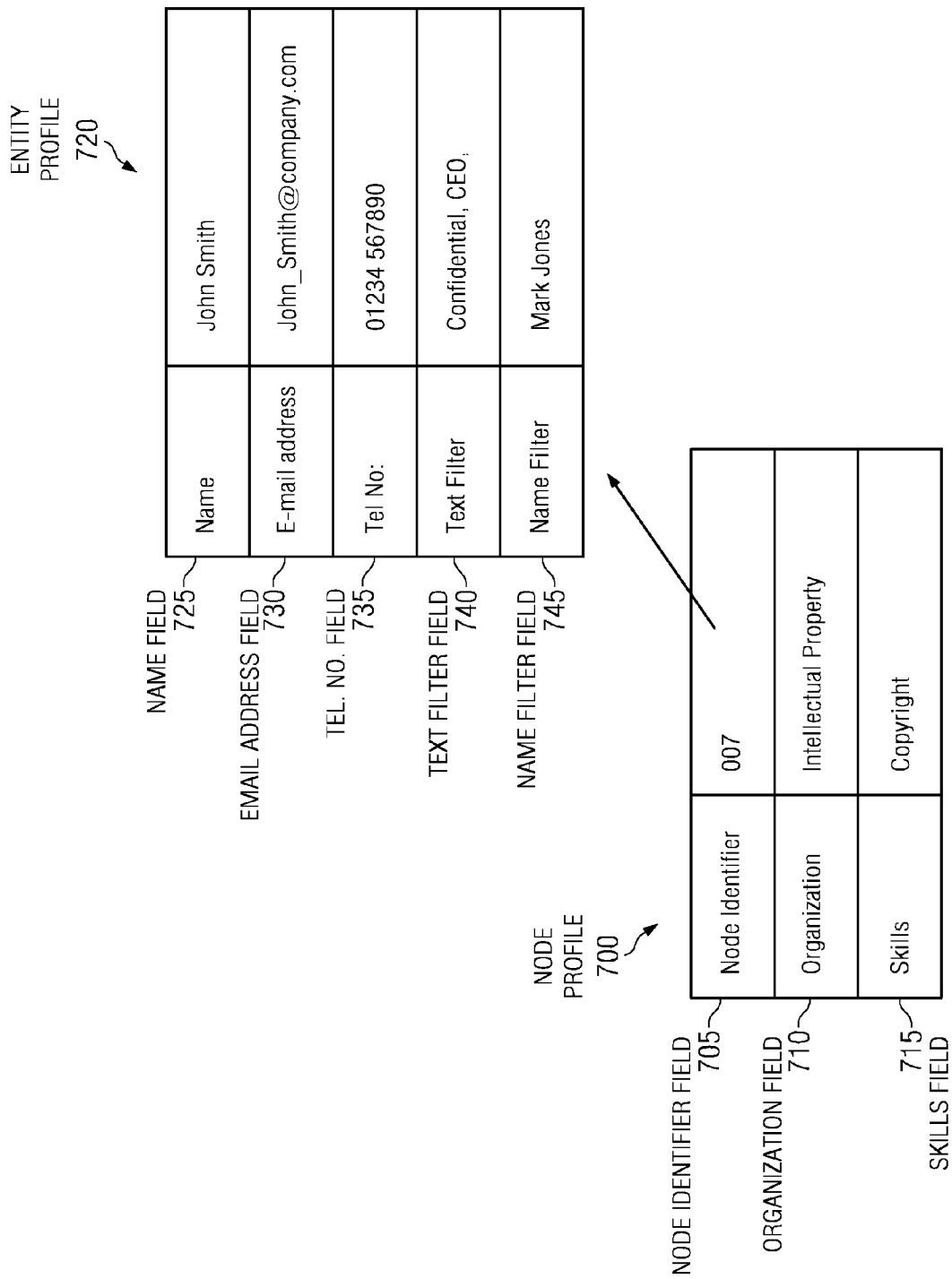
FIG. 7 is an overview diagram of profiles that are used in order to receive an input comprising at least one filter.

The process of the present invention will now be described in more detail, wherein in a first embodiment, the filters are applied by receiving an input from at least one profile associated with each node. With reference to FIG. 7, each node comprises a node profile (700) associated with the node and an entity profile (720) associated with the entity represented by the node. The node profile (700) comprises various fields. A node identifier field (705) comprises a node identifier that uniquely identifies the node within the electronic network. This field (705) comprises a pointer to the entity profile (720). An "Organisation" field (710) comprises data that is associated with the organisation of the node (i.e. the first piece of expertise information). A "Skills" field (715) comprises data that is associated with the skills of the node (i.e. the second piece of expertise information).

The entity profile (720) comprises various fields. The "Name" field (725) comprises data that is associated with the name of the entity (e.g. the name of an individual, the logical name of a computer etc.). The "E-mail address" field (730) comprises data that is associated with the e-mail address of the entity. The "Tel No." field (735) comprises data that is associated with the telephone number of the entity. The "Text filter" field (740) comprises data that is associated with at least one filter, in this case, at least one filter representing text ("Confidential", "CEO"). The "Name filter" (745) field comprises data that is associated with at least one filter, in this case, at least one filter representing a name of an entity.

The filter component (510) is now described in more detail. Firstly, an input comprising at least one filter is received by the filter component (510) by using at least one entity profile. In one example, to apply at least one text filter, the filter component (510) firstly parses the Text Filter field (740) in the entity profile (720) to retrieve the at least one text filter (i.e. the filters representing the text "Confidential" and "CEO"). Next, the filter component (510) parses and searches the electronic messages in order to find the text. Electronic messages that comprise the text "Confidential" and "CEO" are then filtered out of the knowledge network by the filter component (510).

In another example, the filter component (510) parses the Name Filter field (745) in the entity profile (720) to retrieve an input comprising at least one name filter (i.e. the filter representing the name "Mark Jones"). Next, the filter component (510) parses and searches the electronic messages in order to find the name and electronic messages that comprise the name "Mark Jones" are then filtered out of the knowledge network by the filter component (510).

In yet another example, the filter component (510) parses the Name Filter field (745) in the entity profile (720) to retrieve an input comprising at least one name filter. Next, the filter component (510) parses and searches the "Name" fields of the entity profiles of each node for the name. If an entity profile comprising the name is found, the associated node and the electronic messages sent by and received by that node are then filtered out of the knowledge network by the filter component (510).

In a second embodiment, an input comprising a filter or a piece of expertise information is received from an external source to the electronic network e.g. a user, a system, a pre-set input etc. The filter component (510) and the retrieval component (505) are now described in more detail. In one example, a filter represents a time period, wherein the value of the time period is pre-set by a user before processing begins. The filter component (510) receives an input comprising the filter that represents the time period (e.g. the last 24 hours). The filter component (510) then parses and searches the electronic messages in order to find electronic messages that have been sent within that time period. These electronic messages are then filtered out of the knowledge network by the filter component (510).

In another example, the retrieval component (505) receives an input comprising at least one piece of information from an external source. Next, the retrieval component (505) parses and searches the information fields of the node profiles of each node in the electronic network, in order to find the at least one piece of expertise information. For node profiles that are found, the aggregation component (520) aggregates the nodes that communicate with another node and the electronic messages associated with the nodes.

In a third embodiment, when an input comprising a filter or a piece of expertise information is received, headers associated with electronic messages are parsed and searched. One such electronic message (800) is shown in FIG. 8, wherein the electronic message (800) comprises a header (805) and a content portion (810). The header (805) comprises data associated with the node identifier, the organisation that the node belongs to, skills associated with the node, and a time value associated with when the electronic message was sent. The content portion (810) comprises the content of the electronic message (800).

The filter component (510) will now be described in more detail. In one example, the filter component (510) receives an input comprising at least one filter (e.g. a time filter). In response to receiving the at least one filter, the filter component (510) parses and searches the headers of the electronic messages in order to find electronic messages that have been sent within that time period. These electronic messages are then filtered out of the knowledge network by the filter component (510).

The retrieval component (505) will now be described in more detail. In one example, the retrieval component (505) receives input comprising at least one piece of expertise information (e.g. "Intellectual Property"). Next, the retrieval component (505) parses and searches the headers of the electronic messages for the first piece of expertise information. For electronic messages that are found, the aggregation component (520) aggregates the nodes that communicate with another node and the electronic messages associated with the nodes.

It should be understood that the present invention allows capture of knowledge that is distinct from "trivial" communications between nodes, by allowing capture of knowledge associated with expertise. It should also be understood that visualisation firstly occurs by application of at least one piece of information associated with expertise and then optionally, by other factors, such as: the number of electronic messages sent between nodes; one or more portions of the content of the electronic messages etc. It should also be understood that if a node is not associated with a particular piece of expertise information, when an expertise network is created based on that piece of expertise information, that node and the electronic messages sent by and received by that node are excluded from the expertise network.

The present invention can be used for many applications. Firstly, the present invention allows expertise networks of nodes associated with at least one expertise to be determined. In one application, individuals represented as nodes can determine the expertise networks that they are a part of. This is advantageous in allowing the individuals to forge further relationships in the expertise network. For example, in the first expertise network (605) in FIG. 6A, once visualised, the entities represented by nodes 003, 004, and 005 can determine that node 007 is a part of the first expertise network and may be a valuable node that they can form links with. In another application, a user can use the present invention to determine experts in a particular field of expertise, for example, in order to find an answer to a query. In yet another application, the hub(s) of the expertise network can be identified, for example, in the first expertise network 605 of FIG. 6A, node 005 is a hub because the node is communicating with the most number of other nodes in the first expertise network. It can also be seen that node 005 is the hub in the second expertise networks. This is advantageous in identifying the important experts in an organisation for example.

Secondly, the present invention allows expertise networks of nodes associated with more than one expertise to be determined. For example, an expertise network comprising nodes associated with an Intellectual Property organisation and a Record Industry organisation can be determined, providing knowledge regarding the hub(s) in these organisations, the way in which communication about topics such as piracy develops over time etc.

Thirdly, spatial expertise networks of nodes associated with at least one expertise can be determined. In one application, nodes that act as "bridges" between expertise networks can be identified. Advantageously, this allows identification of the nodes that are facilitating communication across expertise networks, for example.

Fourthly, temporal expertise networks of nodes associated with at least one expertise can be determined. In one application, nodes that sporadically or regularly communicate each other can be determined. This allows determination of the types of relationships that the nodes have, for example. In another application, the way in which expertise networks associated with at least one expertise develop over time can be determined. This can lead to the identification of an expertise that is becoming more important over time, for example.

Therefore, advantageously, the creation and visualisation of at least one expertise network provides valuable information to a user, an organisation etc. Furthermore, since expertise networks are determined, for individuals in the expertise network, this allows their other (e.g. social) interactions to be masked, providing a level of privacy. To further provide privacy, when expertise networks are formed, the content of electronic messages can be analysed to ensure that only electronic messages (and associated nodes) associated with a topic of expertise are aggregated.

The present invention is preferably embodied as a computer program product for use with a computer system. Such an implementation may comprise a series of computer readable instructions either fixed on a tangible medium, such as a computer readable media, e.g., diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable media with accompanying printed or electronic documentation, e.g., shrink wrapped software, pre-loaded with a computer system, e.g., on a system ROM or fixed disk, or distributed from a server or electronic bulletin board over a network, e.g., the Internet or World Wide Web.

The invention claimed is:

1. A computer implemented method of information capture for use in an environment comprising a plurality of nodes, the computer implemented method comprising the steps of:

retrieving information associated with the plurality of nodes and information associated with electronic messages that have been communicated by the plurality of nodes, wherein a node communicates with another node via an electronic message, wherein each node represents at least one entity, wherein the plurality of nodes is a knowledge network;

receiving an input comprising expertise information from a user, wherein the input comprises at least one filter;

applying the at least one filter to the electronic messages to filter out electronic messages associated with the filter;

responsive to the at least one filter filtering out all electronic messages associated with a given node in the plurality of nodes, filtering the given node out of the knowledge network;

generating a visualization of nodes and electronic messages remaining in the knowledge network after application of the at least one filter to form a visual representation of the knowledge network, wherein the visual representation comprises a visualization of a number of electronic messages that have been sent and a number of electronic messages that have been received by the nodes in the knowledge network;

responsive to receiving input comprising a first piece of expertise information from the user, determining nodes within the plurality of nodes remaining in the knowledge network that are associated with the first piece of expertise information to form a first set of nodes within the plurality of nodes and aggregating each node in the first set of nodes that is both associated with the first piece of expertise information and communicates with at least one other node in the first set of nodes via an electronic message to form a second set of nodes, wherein a node communicates with at least one other node if the node sends or receives an electronic message with the at least one other node, wherein the second set of nodes and the electronic messages associated with the second set of nodes represent a first expertise network, wherein the first expertise network is a sub-network of the knowledge network;

generating a visualization of nodes and electronic messages in the first expertise network to form a visual representation of the first expertise network, wherein the visual representation comprises a visualization of a number of electronic messages that have been sent and a number of electronic messages that have been received by the nodes in the first expertise network;

responsive to receiving an input comprising a second piece of expertise information from the user, determining nodes within the second set of nodes that are associated with the second piece of expertise information to form a third set of nodes within the plurality of nodes and aggregating each node in the third set of nodes that is both associated with the second piece of expertise information and communicates with at least one other node in the third set of nodes via an electronic message to form a fourth set of nodes, wherein the fourth set of nodes and the electronic messages associated with the fourth set of nodes represent a second expertise network, wherein the second expertise network is a sub-network of the first expertise network;

generating a visualization of nodes and electronic messages in the second expertise network to form a visual representation of the second expertise network, wherein the visual representation comprises a visualization of a number of electronic messages that have been sent and a number of electronic messages that have been received by the nodes in the second expertise network; and determining trends and patterns using the visualization of the knowledge network, the visualization of the first expertise network, and the visualization of the second expertise network.

2. The computer implemented method of claim 1 wherein the information associated with the plurality of nodes in an electronic network and the information associated with the electronic messages that have been communicated by the plurality of nodes is retrieved during a pre-processing phase.

3. The computer implemented method of claim 1 wherein each node in the plurality of nodes retrieves information associated with the electronic messages, information associated with the node itself, and information associated with the nodes that the each node communicates with directly to form retrieved information, and wherein the each node passes the retrieved information to all other nodes in the plurality of nodes.

4. The computer implemented method of claim 1 wherein all nodes not associated with the first piece of expertise information are excluded from the first expertise network, and wherein all electronic communications sent by a node that is excluded from the first expertise network and all electronic communications received by the node that is excluded from the first expertise network are excluded from the first expertise network.

5. The computer implemented method of claim 1 wherein all nodes not associated with the second piece of expertise information are excluded from the second expertise network, and wherein all electronic communications sent by a node that is excluded from the second expertise network and all electronic communications received by the node that is excluded from the second expertise network are excluded from the second expertise network.

* * * * *